(12) United States Patent
Schneberger et al.

(10) Patent No.: US 8,561,601 B2
(45) Date of Patent: Oct. 22, 2013

(54) HEAT EXCHANGER WITH FASTENER

(75) Inventors: Alan Schneberger, Marshalltown, IA (US); Raymond J. Wojcieson, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 561 days.

(21) Appl. No.: 12/834,582

(22) Filed: Jul. 12, 2010

(65) Prior Publication Data

US 2011/0174290 A1 Jul. 21, 2011

Related U.S. Application Data

(60) Provisional application No. 61/295,501, filed on Jan. 15, 2010.

(51) Int. Cl.
*F24H 3/06* (2006.01)

(52) U.S. Cl.
USPC ........ 126/99 R; 126/112; 126/99 C; 165/152; 165/170

(58) Field of Classification Search
USPC ........ 126/99 R, 112, 99 C; 165/152, 170, 81; 411/361
See application file for complete search history.

(56) References Cited

U.S. PATENT DOCUMENTS

| | | | | |
|---|---|---|---|---|
| 133,737 A * | 12/1872 | Wooten | | 411/501 |
| 271,035 A * | 1/1883 | Carpenter | | 16/2.1 |
| 1,122,280 A * | 12/1914 | Kempshall | | 29/505 |
| 1,890,620 A * | 12/1932 | Bradley et al. | | 165/133 |
| 2,043,496 A * | 6/1936 | Schneider | | 62/471 |
| 2,101,060 A * | 12/1937 | Gookin | | 24/713.7 |
| 2,391,028 A * | 12/1945 | Miles | | 126/99 R |
| 3,526,955 A * | 9/1970 | Cilione | | 29/512 |
| 3,754,310 A * | 8/1973 | Shea | | 29/25.42 |
| 4,145,862 A * | 3/1979 | Sygnator | | 52/796.1 |
| 4,479,287 A * | 10/1984 | Asaka | | 29/512 |
| 4,982,785 A * | 1/1991 | Tomlinson | | 165/170 |
| 5,361,483 A * | 11/1994 | Rainville et al. | | 29/524.1 |
| 6,338,601 B1 * | 1/2002 | Mauer et al. | | 411/503 |
| 6,422,306 B1 * | 7/2002 | Tomlinson et al. | | 165/170 |
| 7,351,022 B2 * | 4/2008 | Denslow | | 411/501 |
| 7,996,975 B1 * | 8/2011 | Denslow | | 29/419.1 |
| 2002/0040777 A1 * | 4/2002 | Tomlinson et al. | | 165/163 |
| 2002/0048487 A1 * | 4/2002 | Mauer et al. | | 403/332 |
| 2006/0067806 A1 * | 3/2006 | Denslow | | 411/504 |
| 2011/0277974 A1 * | 11/2011 | Haydock et al. | | 165/170 |
| 2012/0017417 A1 * | 1/2012 | Denslow | | 29/524.1 |

* cited by examiner

*Primary Examiner* — Kenneth Rinehart
*Assistant Examiner* — Jorge Pereiro

(57) ABSTRACT

A clamshell heat exchanger includes a first clamshell half and a second clamshell half. The first and second clamshell halves each include a through-hole therein. The first and second clamshell halves form a passageway, with a seal region located between portions of the passageway. A fastener is located within the first and second through-holes within the seal region. The fastener is configured to rigidly join the first clamshell half to the second clamshell half while allowing relative lateral motion between said first and said second clamshell halves.

17 Claims, 9 Drawing Sheets

1

HEAT EXCHANGER WITH FASTENER

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System", and incorporated herein by reference in its entirety.

TECHNICAL FIELD OF THE INVENTION

The present invention is directed, in general to an HVAC system, and more specifically, to a heat exchanger.

BACKGROUND OF THE INVENTION

A high-efficiency furnace typically employs several heat exchangers to warm an air stream passing through the furnace. The heat exchanger may include "clamshell" halves formed by stamping metal sheets, the halves being fastened together in a clamshell assembly to form a passageway for burning fuel and directing hot flue gas. The heat exchanger typically has a large temperature gradient when operating, placing the clamshell halves under significant stress.

SUMMARY OF THE INVENTION

In one aspect the present disclosure provides a clamshell heat exchanger. The heat exchanger includes a first clamshell half and a second clamshell half. The first and second clamshell halves each include a through-hole therein. The first and second clamshell halves form a passageway, with a seal region located between portions of the passageway. A fastener is located within the first and second through-holes within the seal region. The fastener is configured to rigidly join the first clamshell half to the second clamshell half while allowing relative lateral motion between said first and said second clamshell halves.

In other aspect, a furnace is provided. The furnace includes a cabinet, a blower and a heat exchanger. The blower is configured to move air through the cabinet. The heat exchanger is located within the cabinet and configured to transfer heat from a burned fuel to the air. The heat exchanger includes a first clamshell half and a second clamshell half. The first and second clamshell halves each include a through-hole therein. The first and second clamshell halves form a passageway, with a seal region located between portions of the passageway. A fastener is located within the first and second through-holes within the seal region. The fastener is configured to rigidly join the first clamshell half to the second clamshell half while allowing relative lateral motion between said first and said second clamshell halves.

In yet another aspect, a method of manufacturing a furnace is provided. The method includes forming a first clamshell half and a second clamshell half. The first clamshell half includes a first through-hole therein, and a second clamshell half includes a second through-hole therein. The first and second clamshell halves are configured to form a passageway when joined and a seal region between portions of the passageway. The method further includes installing a fastener within the first and second through-holes within the seal region. The installation of the fastener rigidly joins the first clamshell half to the second clamshell half while allowing relative lateral motion between the first and the second clamshell halves.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
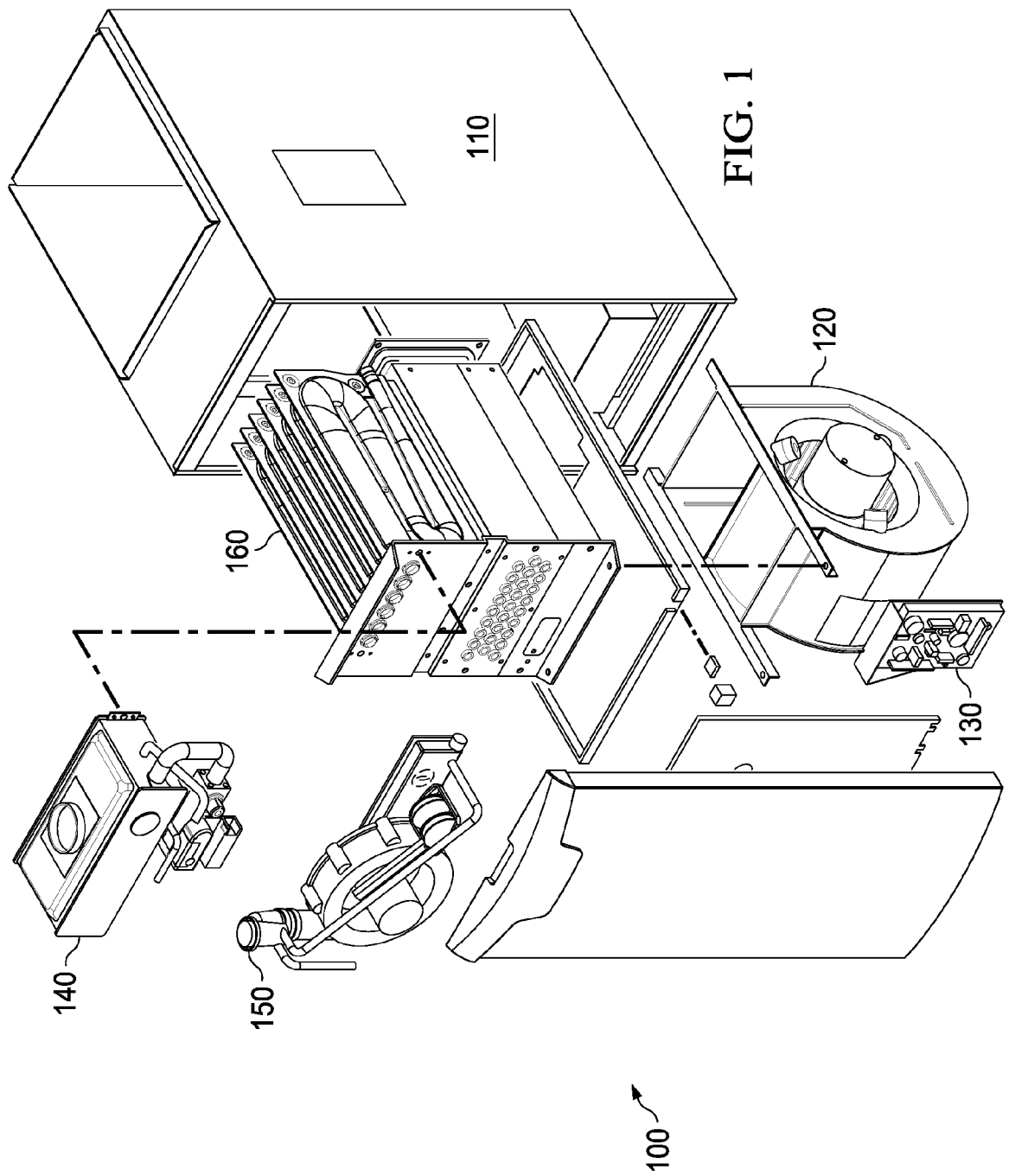
FIG. 1 illustrates a furnace of the disclosure.

Referring initially to FIG. 1, illustrated is a furnace 100 of the disclosure. The furnace 100 is described without limitation in terms of a gas-fired system. Those skilled in the pertinent art will appreciate that the principles disclosed herein may be extended to furnace systems using other fuel types. The furnace 100 includes various subsystems that may be conventional. A cabinet 110 encloses a blower 120, a controller 130, burners 140, and a combustion air inducer 150. Optionally a burner box encloses the burners 140, as illustrated. A heat exchanger assembly 160 is configured to operate with the burners 140 and the combustion air inducer 150 to burn a heating fuel, e.g. natural gas, and move exhaust gases through the heat exchanger assembly 160. The controller 130 may further control the blower 120 to move air over the heat exchanger assembly 160, thereby transferring heat from the exhaust gases to the air stream.

Figure 2:
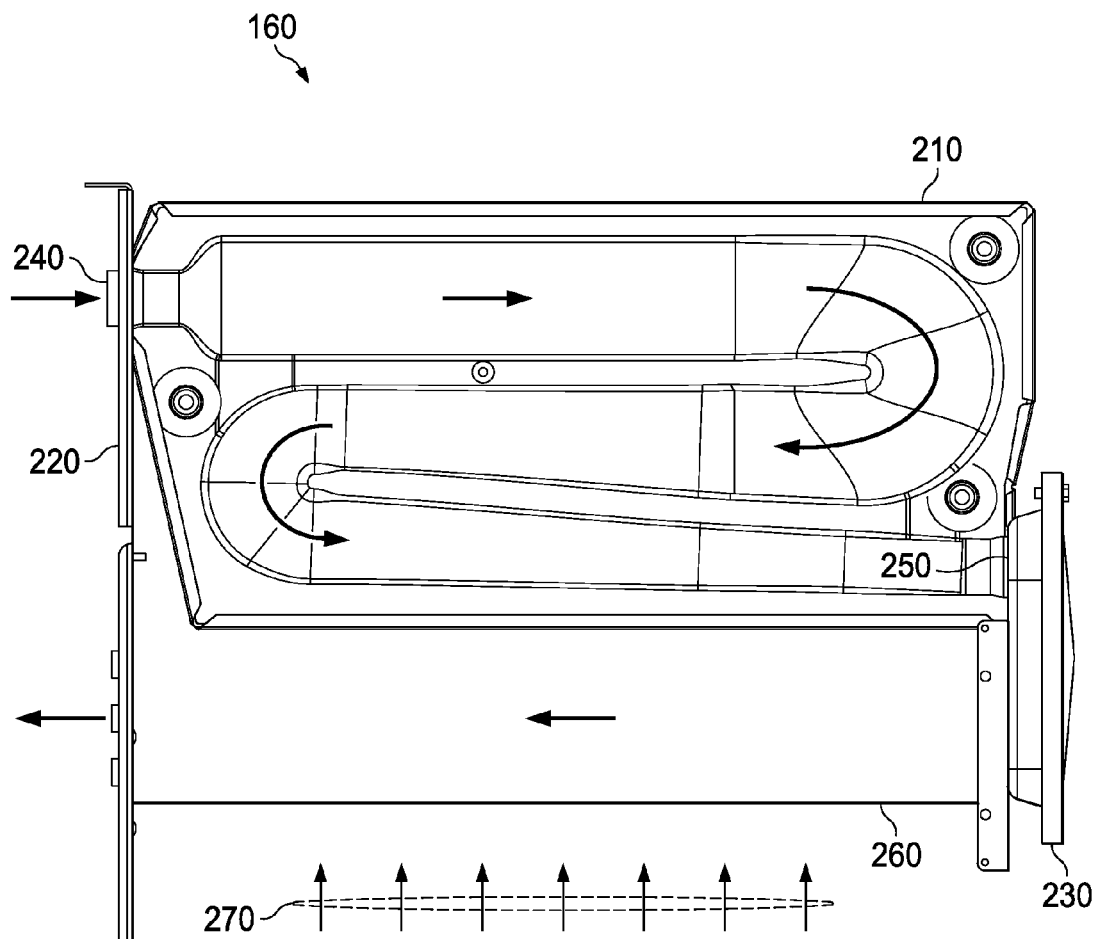
FIG. 2 illustrates a heat exchanger assembly of the disclosure.

FIG. 2 presents a side view of the heat exchanger assembly 160. The heat exchanger assembly 160 is illustrated by way of example without limitation to a particular configuration of a plurality of heat exchangers 210 and associated components. The heat exchanger 210 is representative of each heat exchanger of the plurality of heat exchangers 210. The heat exchanger 210 is joined to a vest panel 220 and a collector box manifold 230. A burning fuel stream enters the heat exchanger 210 at an inlet 240. Exhaust gas leaves the heat exchanger 210 at an outlet 250 and is drawn through a collector box 260 by the combustion air inducer 150. The plurality of heat exchangers 210 heat an air stream 270 forced over the heat exchanger assembly 160 by the blower 120.

Figure 3:
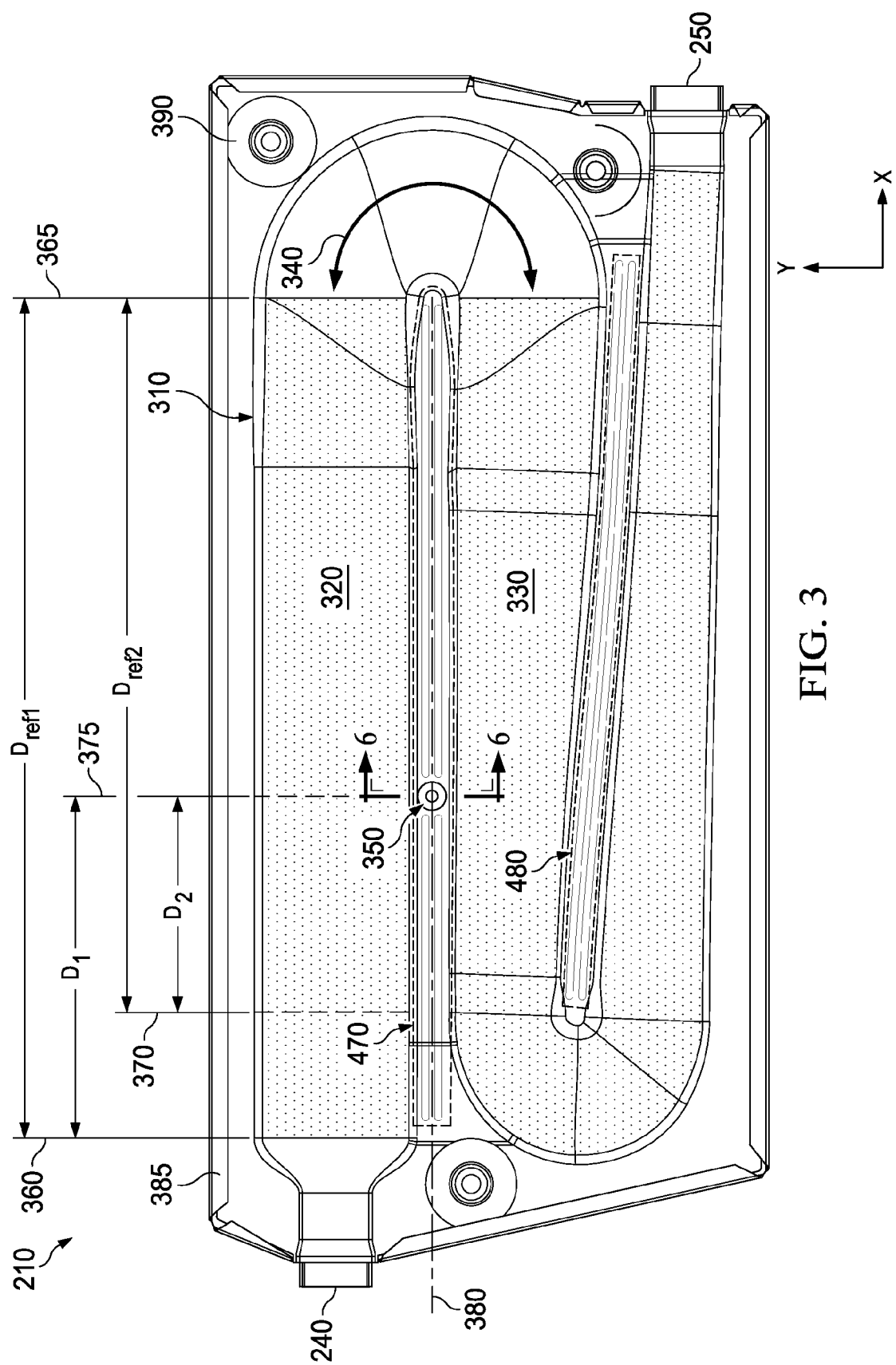
FIG. 3 illustrates a single clamshell heat exchanger of the disclosure, e.g. one of the heat exchangers in the assembly of FIG. 2.

FIG. 3 illustrates a single heat exchanger 210 in greater detail. A passageway 310 is located between the inlet 240 and the outlet 250. The passageway 310 is illustrated without limitation as a serpentine passageway. In other embodiments the passageway 310 may be a U-shaped passageway, such that the inlet 240 and the outlet 250 are located on a same side of the heat exchanger 210.

The passageway 310 includes a combustion region 320 and an exhaust region 330. The combustion region 320 is that portion of the passageway 310 located about between the inlet 240 and a first "U-bend" 340. The combustion region 320 receives a burning fuel/air mixture from one of the burners 140 via the inlet 240. The burning fuel is substantially consumed within the combustion region 320, thereby producing combustion gases, e.g. flue gas, and releasing heat. The exhaust gas travels to the outlet 250 via the exhaust region 330.

A substantial portion of the heat transfer occurs within the combustion region 320. During operation the heat of combustion is transferred to the heat exchanger 210 as the flue gas flows through the passageway 310. The heat is then transferred to the air stream 270. In some cases the efficiency of the heat exchanger 210, e.g. the fraction of combustion heat transferred to the air stream 270, may be about 70% or more. The temperature of the combustion region 320 at least in some locations is greater than that of the exhaust region 330, creating a thermal gradient within the heat exchanger 210. Moreover, the pressure of the gas within the combustion region may be greater at least in some locations than the pressure within the exhaust region 330.

Figure 4A:
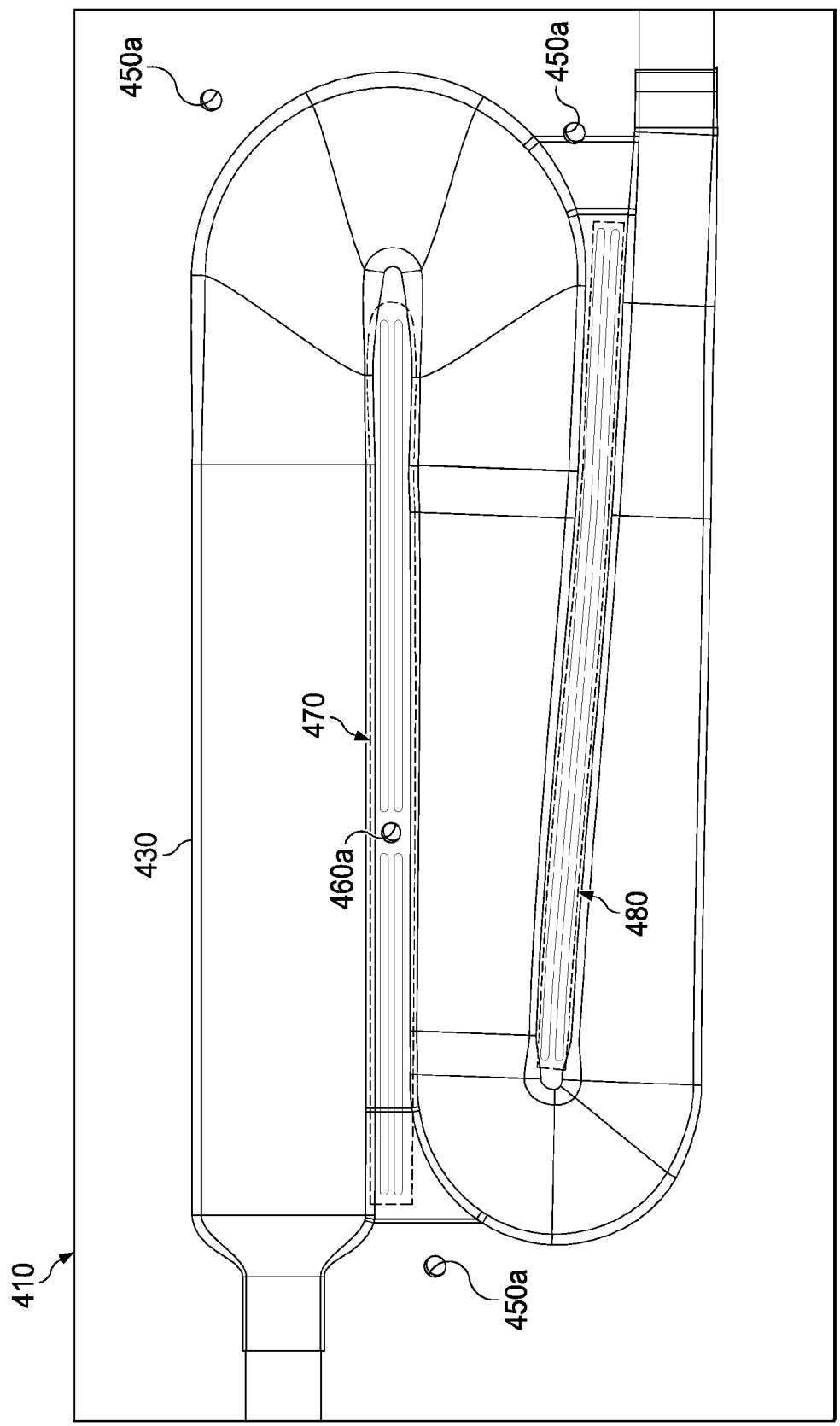
FIGS. 4A and 4B illustrate two clamshell halves of the disclosure configured to receive a fastener, e.g. the eyelet of FIGS. 5A-5C.
Figure 4B:
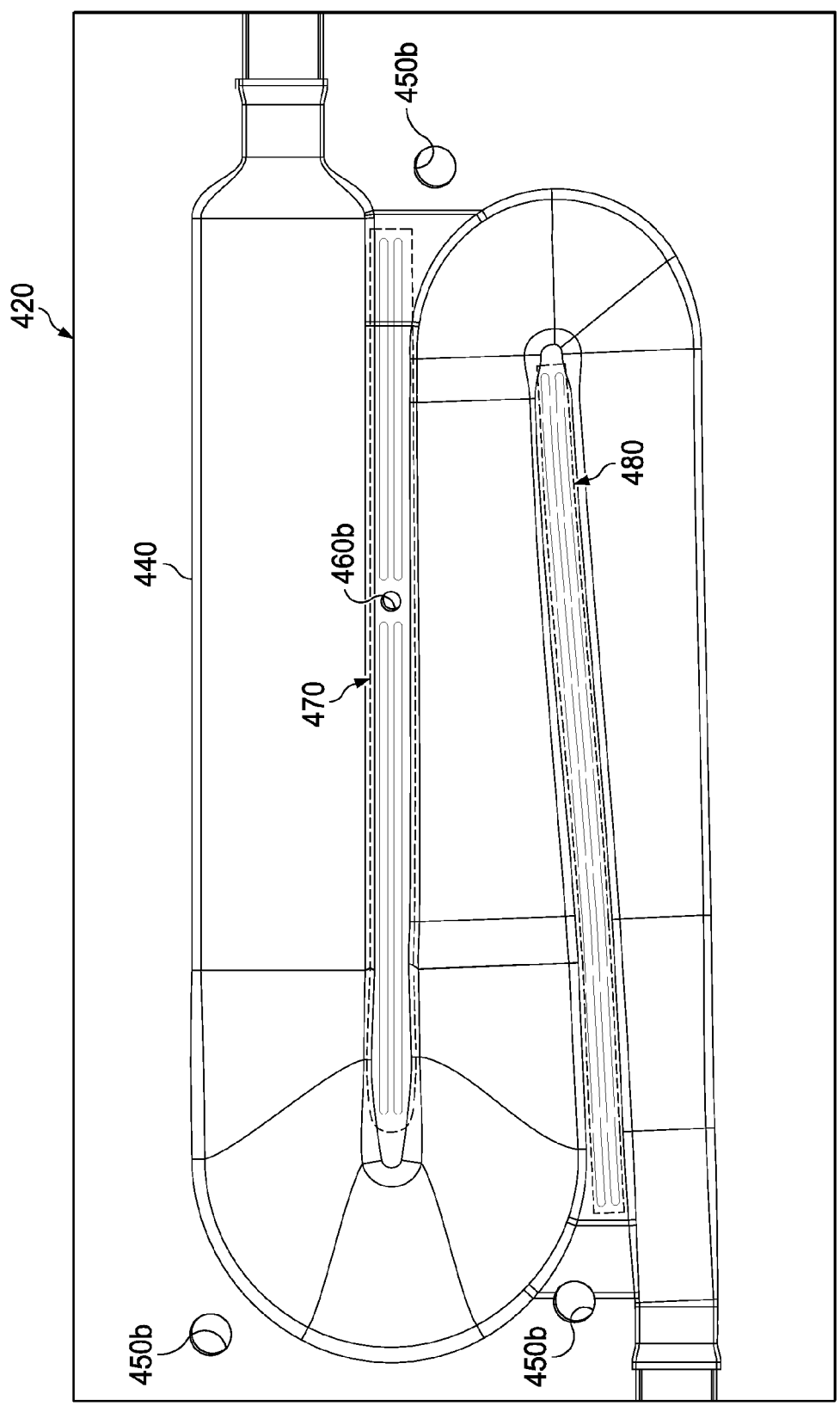

Referring to FIG. 4, illustrated is a first clamshell half 410 and a second clamshell half 420. The clamshell halves 410, 420 may be formed and then joined to form the heat exchanger 210. The clamshell halves 410, 420 may be conventionally formed from sheet metal stamped into the desired shape. The clamshell halves 410, 420 may be formed of any type of sheet metal suitable for use in heat exchanger applications. Such materials include, without limitation, aluminized steel (TI-25, e.g.), drawing quality high temperature (DQHT) sheet, extra-deep drawing steel (EDDS), and stainless steel. In various embodiments the sheet metal has a thickness of about 0.73 mm (0.029 inch).

When the clamshell halves 410, 420 are assembled, the passageway halves 430, 440 form the passageway 310. The clamshell halves 410, 420 may be joined by an edge crimp seal 385 (FIG. 3), in which a portion of one of the clamshell halves 410, 420 is folded over the other of the clamshell halves 410, 420 at the perimeter of the heat exchanger 210. The clamshell halves 410, 420 include a number of fastener locations configured to rigidly affix the first clamshell half 410 to the second clamshell half 420. In the illustrative embodiment, presented without limitation, the first clamshell half 410 includes three "button mushroom" joint locations 450a that are configured to match three corresponding mushroom joint locations 450b on the second clamshell half 420. As will be appreciated by those skilled in the pertinent art, mushroom joints 390 (FIG. 3) may be formed by a stamping operation that deforms a first side of the joint, e.g. 450a, such that the first side interlocks with the second side of the joint, e.g. 450b, to form a rigid connection between the clamshell halves 410, 420. In alternate embodiments, the button mushroom joints 390 may be replaced by, e.g. sheet metal screws, bolts, or fastening eyelets.

Seal regions 470, 480 are configured to restrict the flow of combustion gas vertically within the heat exchanger 210, e.g. about parallel to the y-direction of FIG. 3. Those skilled in the pertinent art will appreciate that the clamshell halves 410, 420 may be formed such that the surfaces thereof within the seal regions 470, 480 press tightly together. Thus, flue gas is expected to preferentially flow within the passageway 310 rather than vertically. However, during operation the aforementioned thermal gradient may cause thermal stress to deform the clamshell halves 410, 420 such that some gas may flow therebetween in the seal regions 470, 480. If combustion gas is permitted to leak, e.g. from the combustion region 320 to the exhaust region 330, heat that would otherwise be captured by the heat exchanger 210 may not be recovered, reducing the efficiency of the heat exchanger below its nominal design value. Moreover, if the clamshell halves 410, 420 are permitted to deform under thermal stress, the distribution of stress may be difficult to predict and account for in the design of the heat exchanger 210.

To address this issue the clamshell half 410 may be fastened to the clamshell half 420 within the seal regions 470, 480. It is expected that leakage leading to efficiency loss will be most significant at the location of the seal region 470. Therefore the following discussion will focus on the seal region 470 without limitation, with the understanding that the principles discussed may be extended to the seal region 480.

The first clamshell half 410 includes a through-hole 460a that corresponds to a through-hole 460b located within the second clamshell half 420. When the clamshell halves 410, 420 are joined, the through-holes 460a, 460b align to provide a through-hole within the heat exchanger 210. For brevity, the through-hole formed by the alignment of the through-holes 460a, 460b is referred to hereinafter as the through-hole 460. Referring to FIG. 3, a fastener 350, discussed further below, is located within the through-hole 460.

As described further below, the fastener 350 rigidly joins the first clamshell half 410 to the second clamshell half 420 at the location of the through-hole 460. By "rigidly joins", it is meant that the fastener 350 substantially prevents relative motion of the clamshell halves 410, 420 in the z-direction at the location of the through-hole 460. Such prevention may reduce leakage between the combustion region 320 and the exhaust region 330.

However, during operation, the stress on the clamshell halves 410, 420 may concentrate in the vicinity of the fastener 350. If a conventional means were used to join the clamshells 410, 420, such as a mushroom joint, such concentration may lead to fatigue and fracture of one or both of the clamshell halves 410, 420 after a number of thermal cycles. In some cases, a fracture may form before the heat exchanger 210 has reached a desired operational life, e.g. twenty years.

However, this disclosure reflects the recognition that the lifetime of the heat exchanger 210 may be advantageously extended by configuring the fastener 350 to allow relative lateral motion between the clamshell halves 410, 420. In this context, lateral motion means motion in the x-y plane of the heat exchanger 210 (see FIG. 3.) A small degree of motion is thought to be sufficient to produce the anticipated benefit. In some cases, for instance, the relative motion allowed by the fastener 350 may only be on the order of 100 μm or less. Such motion in many cases is expected to provide a sufficient reduction of stress to result in the described increase of lifetime.

Referring to FIG. 3, the location of the fastener 350 is not limited to any particular location within the seal region 470. However, in some embodiments, it may be preferred to locate the fastener 350 centrally along an axis 380 between the combustion region 320 and the exhaust region 330. In various embodiments it is desirable to locate the fastener 350 in a region of locally higher stresses that might otherwise cause a gap to form between the clamshell halves 410, 420. An optimal location will in general depend on the specifics of the geometry of the heat exchanger 210.

A number of references are defined for clarity in the following discussion. References 360 and 365 respectively mark the beginning and end of the combustion region 320. In one aspect the beginning of the combustion region 320 is the location at which the combustion region 320 initially reaches its maximum width, e.g. where the walls of the combustion region 320 become about parallel. A reference 370 marks the location after the inlet 240 at which a wall of the combustion region 320 becomes about parallel with an adjacent wall of the exhaust region 330. A reference 375 marks the location of the fastener 350. A reference length $D_{ref1}$ is the distance from the reference 360 to the reference 365. A reference length $D_{ref2}$ describes the distance from the reference 370 and the reference 365.

In some cases, for example, the fastener 350 (reference 375) is located within the seal region 470 at a distance $D_1$ that is between 40% and 60% of $D_{ref1}$. In some cases a preferred range of $D_1$ may be between about 40% and 50% of $D_{ref1}$. In yet some other cases, a more preferred range of $D_1$ may be between about 40% and about 45% of $D_{ref1}$. In some embodiments, the fastener 350 is located a distance $D_2$ that is between about 25% and about 35% of $D_{ref2}$. In some cases a more preferred value of $D_2$ is about 30%±1% of $D_{ref2}$.

While only one fastener 350 is shown in FIG. 3, the disclosure contemplates embodiments that include multiple placements of the fastener 350 within the seal region 470. For example, two fasteners 350 may be respectively placed at about 1/3 and 2/3 the distance from the reference 360 to the reference 365. Moreover, if desired the fastener 350 may be placed at any location within the seal region 480. Moreover, the fastener 350 may be placed in other locations outside the seal region 470. For example, in embodiments of the heat exchanger having multiple seal regions between a heat exchanger passageway, such as the illustrated serpentine passageway 310, the fastener 350 may be located within another seal region separating portions of the passageway, such as the seal region 480 in the case of the passageway 310.

Figure 5A:
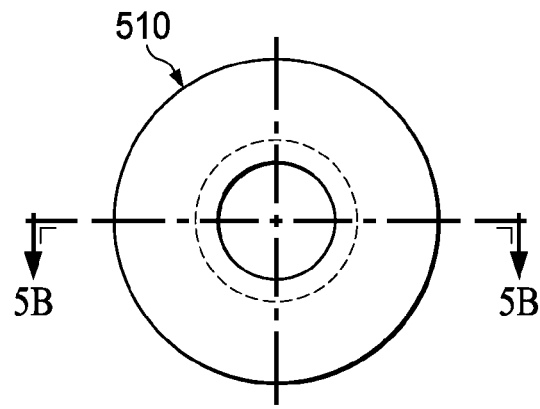
FIG. 5A-5C illustrate an eyelet configured to fasten two clamshell halves, e.g. the clamshell halves of FIGS. 4A and 4B.
Figure 5B:
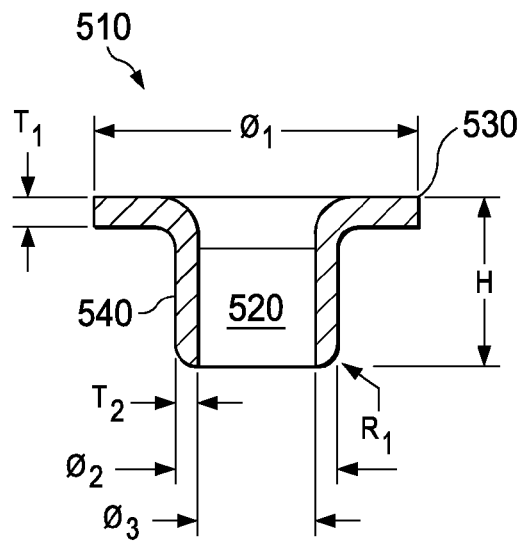
Figure 5C:
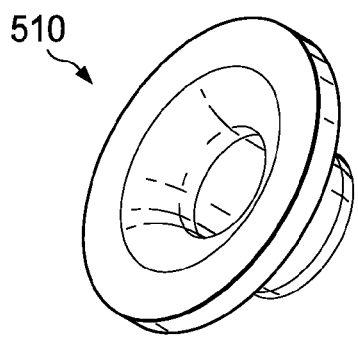

FIGS. 5A-5C illustrate aspects of an eyelet 510 configured to operate as the fastener 350 to fasten the clamshell half 410 to the clamshell half 420 while providing for the aforementioned relative lateral motion. FIG. 5A illustrates a view along the axis of a central opening 520 of the eyelet 510, FIG. 5B illustrates a sectional view, and FIG. 5C illustrates an isometric view. The eyelet 510 includes a shoulder portion 530 and a cylindrical portion 540.

The eyelet 510 is not limited to any particular size. Illustratively, in one embodiment the eyelet 510 is configured to fasten clamshell halves that are about 0.73 mm thick, for a total of about 1.46 mm. For such an embodiment, the eyelet 510 may have a height H of about 7.24 mm (0.285 inch), a shoulder portion 530 diameter $ø_1$ of about 12.7 mm (0.5 inch), an outside diameter $ø_2$ of the cylindrical portion 540 of about 6.35 mm (0.25 inch) and an inner diameter $ø_3$ of about 4.44 mm (0.175 inch). The through-hole 460 may have a diameter of about 6.76 mm (0.266 inch) to accommodate the eyelet 510 with sufficient clearance to provide the aforementioned lateral motion. In various embodiments the eyelet 510 is formed from C1008/C1010 low carbon cold rolled steel with a thickness $T_1$ of about 0.89 mm (0.035 inch). A thickness $T_2$ may be constrained to be at least about 0.76 mm (0.30 inch) to ensure consistent mechanical behavior in a later installation step. A radius $R_1$ of the cylindrical portion 540 may be about 1.52 mm (0.06 inch) to aid installation of the eyelet 510 in the through-hole 460 and/or to avoid accumulation of eyelet material in a later-formed fastener joint (see FIG. 6).

Figure 6:
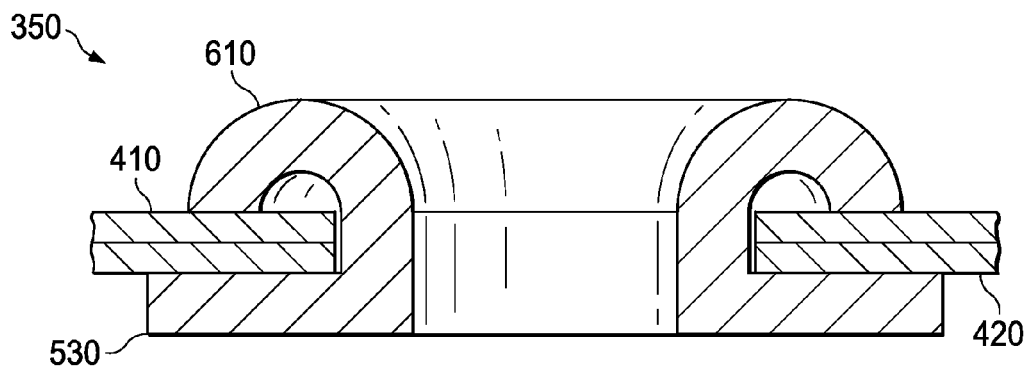
FIG. 6 illustrates a fastener, e.g. the eyelet of FIGS. 5A-5C installed in matched through-holes of two clamshell halves, e.g. the clamshell halves of FIGS. 4A and 4B.

FIG. 6 illustrates a sectional view of the fastener 350, e.g. an installed eyelet 510, formed within the through-hole 460 in accordance with one illustrative embodiment of the disclosure. The eyelet 510 has been worked as described below to produce a rolled portion 610. The rolled portion 610 and the shoulder portion 530 cooperate to mechanically secure the clamshell halves 410, 420.

Figure 7A:
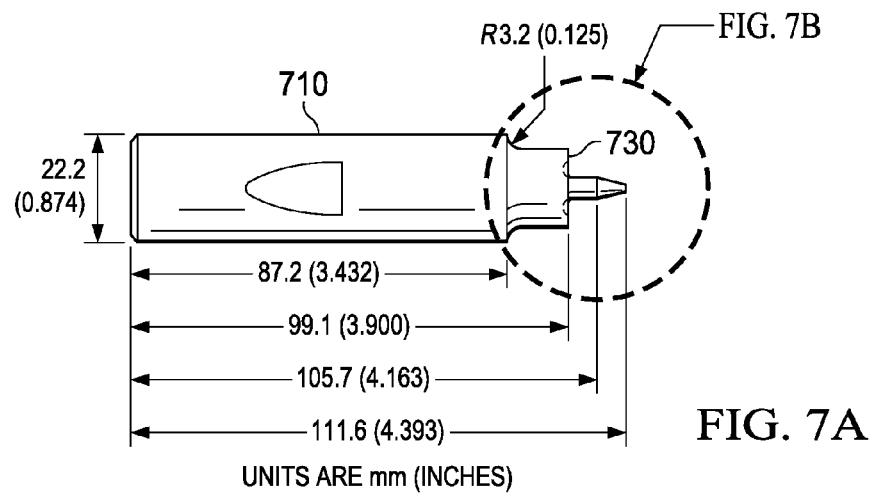
FIGS. 7A, 7B, 8A and 8B illustrate an installation tool set configured to fasten two heat exchanger clamshell halves using the eyelet of FIGS. 5A-5C.
Figure 8A:
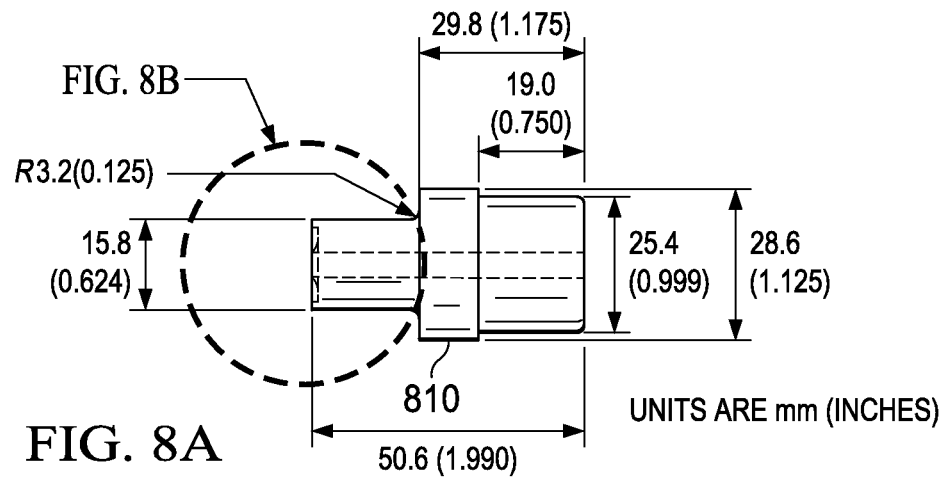

FIGS. 7A/7B and 8A/8B illustrate, with continuing reference to FIG. 5B, a tool set configured to deform the eyelet 510 to fasten the clamshell halves 410, 420. FIGS. 7A/7B illustrates a punch 710, while FIGS. 8A/8B illustrates an anvil 810 that is configured to cooperate with the punch 710 to install the eyelet 510. The punch 710 and anvil 810 may be conventionally formed from, e.g. tool steel.

Figure 7B:
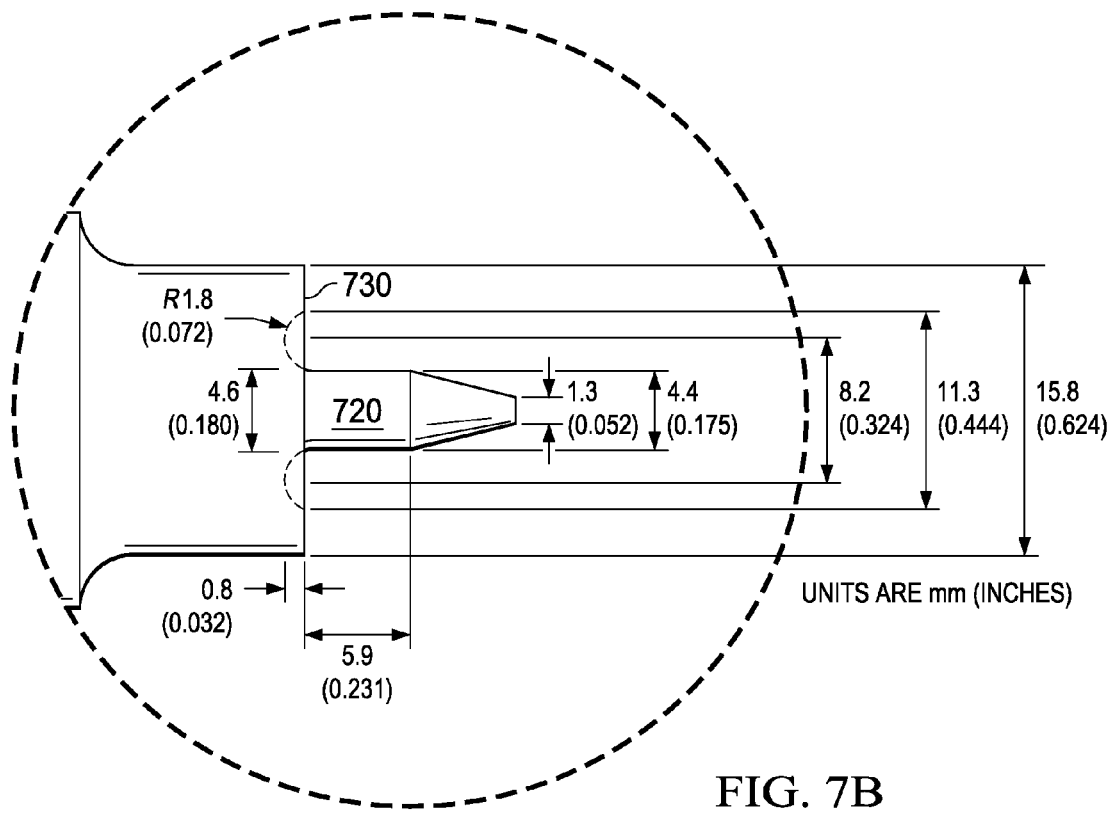
Figure 8B:
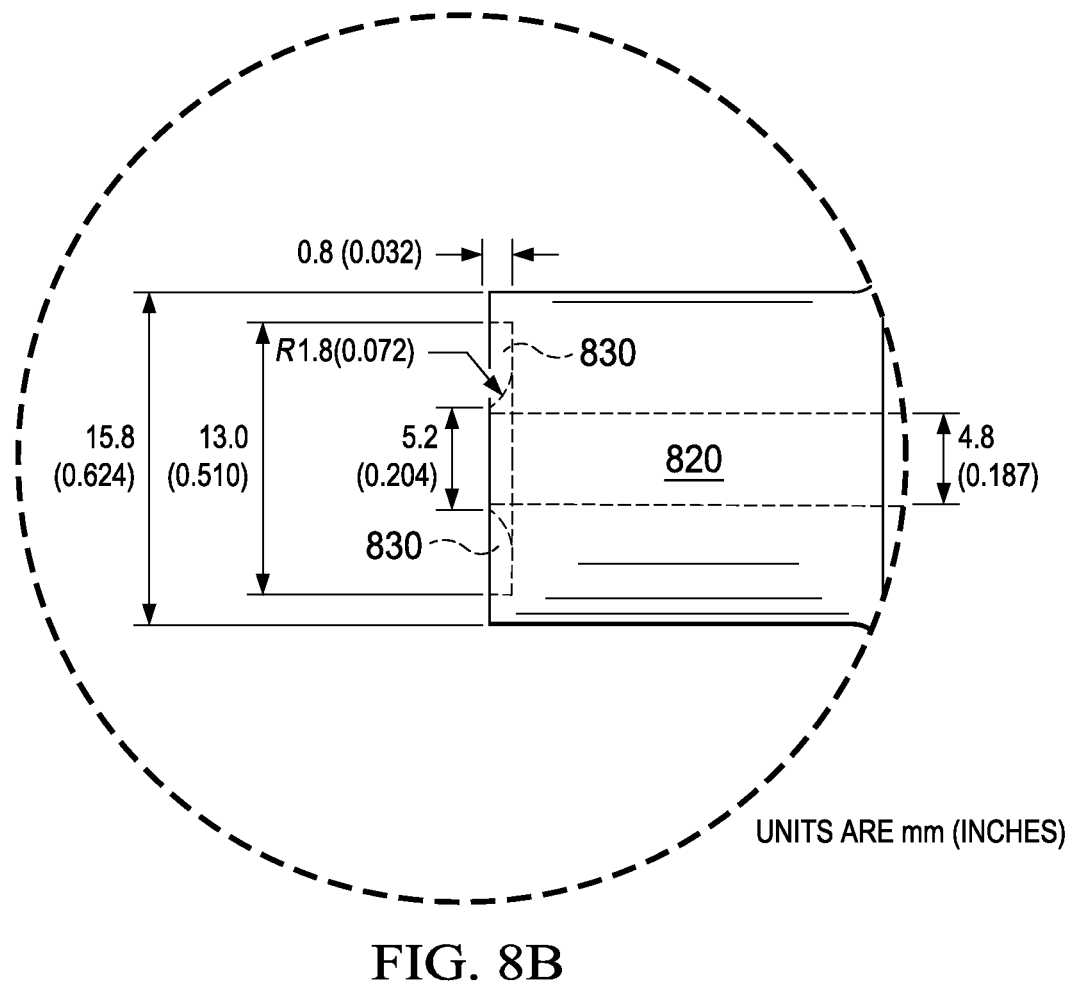

The punch 710 includes a spindle 720 having a diameter about equal to $ø_3$, and a spreading surface 730. The anvil 810 includes a central opening 820 also having a diameter about equal to $ø_3$ to receive the spindle 720, and a recess 830 shaped to receive the shoulder portion 530 of the eyelet 510. FIGS. 7 and 8 include values of various dimensions of the punch 710 and the anvil 810 according to one illustrative embodiment. Those of ordinary skill will appreciate that many variations of the illustrated embodiment are possible without departing from the scope of the disclosure.

Illustratively, during installation of the eyelet 510, the eyelet 510 is captured by the recess 830. The cylindrical portion 540 is inserted into the through-hole 460, after which punch 710 engages the eyelet 510 by inserting the spindle 720 into the central opening 520.

The punch 710 and the anvil 810 are pressed together with sufficient force to cause the spreading surface 730 to spread the cylindrical portion 540 outward from the central opening 520. With continued force, the cylindrical portion 540 curls around to form the rolled portion 610. Sufficient force may be applied to cause the shoulder portion 530 and the rolled portion 610 to rigidly secure the first clamshell half 410 to the second clamshell half 420. In an illustrative and nonlimiting embodiment, when the eyelet 510 has the characteristics as described with respect to FIG. 5, the punch 710 may be pressed against the eyelet 510 with a force of about 18.7E3 N (about 4200 lbs) to form the installed eyelet.

Figure 9:
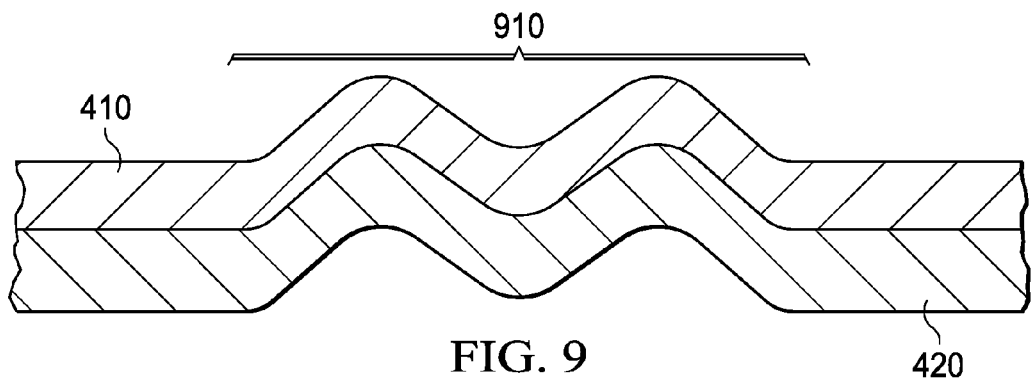
FIG. 9 illustrates an interference pattern according to one embodiment of a heat exchanger, e.g. the heat exchanger 210.

FIG. 9 illustrates an interference pattern 910 that may optionally be placed within the seal regions 470, 480 to reduce gas leakage between portions of the passageway 310. The interference pattern 910 and formation thereof are described in detail in co-pending U.S. patent application Ser. No. 12/834,145, filed on Jul. 12, 2010, entitled, HEAT EXCHANGER HAVING AN INTERFERRENCE RIB (ACCOLADE) to Donald N Zimmer, incorporated herein by reference in its entirety. The interference pattern 910 is expected to significantly reduce leakage between the combustion region 320 and the exhaust region 330. However, if a gap were to form between the clamshell halves 410, 420 due to heat-related stress, the effectiveness of the interference pattern 910 could be compromised. The use of the eyelet 510 in combination with the interference pattern 910 is expected to provide a particularly effective means to prevent significant leakage between the combustion region 320 and the exhaust region 330 by preventing such a gap, while providing the aforementioned relative movement between the clamshell halves 410, 420 to reduce the incidence of stress-related failure.

Figure 10:
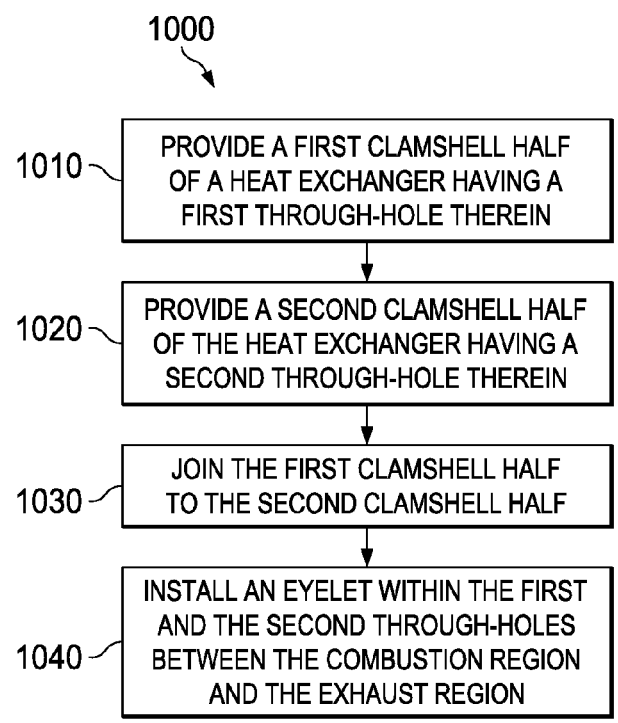
FIG. 10 presents a method of manufacturing a furnace, e.g. the furnace 100 of FIG. 1.

Turning to FIG. 10, illustrated is a method generally designated 1000 of forming a heat exchanger. The method 1000 may be performed in an order other than the order presented in FIG. 10. In a step 1010 a first clamshell half is provided having a first through-hole therein, e.g. the clamshell half 410. Herein and in the claims, "provided" means that a device, substrate, structural element, etc., may be manufactured by the individual or business entity performing the disclosed methods, or obtained thereby from a source other than the individual or entity, including another individual or business entity.

In a step 1020 a second clamshell half is provided having a second through-hole therein, e.g. the clamshell half 420. The second clamshell half is configured to form a passageway, e.g. the passageway 310, when joined to said first clamshell half. The passageway has a combustion region and an exhaust region, e.g. the combustion region 320 and an exhaust region 330.

In a step 1030 the first clamshell half is joined to the second clamshell half. In some embodiments the first and second clamshell halves are joined by an edge crimp seal 385 and one or more mushroom joints 390. In a step 1040 a fastener, e.g. the fastener 350, is installed within the first and second through-holes between the combustion region and said exhaust region.

Although the present invention has been described in detail, those skilled in the art should understand that they could make various changes, substitutions and alterations herein without departing from the spirit and scope of the invention in its broadest form.

What is claimed is:

1. A clamshell heat exchanger, comprising:
   a first clamshell half having a first through-hole therein;
   a second clamshell half having a second through-hole therein;
   a passageway formed by first and second clamshells, with a seal region located between portions of said passageway, and
   a fastener located within said first and second through-holes within said seal region, said fastener configured to rigidly join said first clamshell half to said second clamshell half while allowing relative lateral motion between said first and said second clamshell halves, wherein said fastener is located adjacent an interference pattern located within said seal region.

2. The clamshell heat exchanger of claim 1, wherein said fastener includes a shoulder portion and a rolled portion, said first and second clamshell halves being located between said shoulder portion and said rolled portion.

3. The clamshell heat exchanger of claim 1, wherein said fastener is located between a combustion region and an exhaust region of said passageway.

4. The clamshell heat exchanger of claim 3, wherein said fastener is located at a distance from a beginning of said combustion region that is between about 40% and about 50% of a distance from a beginning of said combustion region to an end of said combustion region.

5. The clamshell heat exchanger of claim 3, wherein said combustion region has a location after a heat exchanger inlet at which adjacent walls of said combustion region and said exhaust region become about parallel, and said fastener is located at a distance from said location that is about 30% of a distance from said location to an end of said combustion region.

6. The clamshell heat exchanger of claim 1, wherein said passageway is a serpentine passageway.

7. A method of manufacturing a clamshell heat exchanger, comprising:
   providing a first clamshell half having a first through-hole therein;
   providing a second clamshell half having a second through-hole therein, said second clamshell half being configured to form a passageway when joined to said first clamshell half, a seal region being located between portions of said passageway; and
   joining said first clamshell half to said second clamshell half; and
   installing a fastener within said first and second through-holes within said seal region, said fastener configured to rigidly join said first clamshell half to said second clamshell half while allowing relative lateral motion between said first and said second clamshell halves, wherein said fastener is located adjacent an interference pattern located within said seal region.

8. The method of claim 7, wherein said fastener is an eyelet that includes a ring portion and a crimped portion, said first and second clamshell halves being located between said ring portion and said crimped portion.

9. The method of claim 7, wherein only one of said fastener is located between a combustion region and an exhaust region of said passageway.

10. The method of claim 7, wherein said fastener is located at a distance from a beginning of said combustion region that is between about 40% and about 50% of a distance from a beginning of said combustion region to an end of said combustion region.

11. The method of claim 7, wherein said passageway includes a serpentine passage.

12. A furnace, comprising:
    a cabinet;
    a blower configured to move air through said cabinet; and
    a heat exchanger located within said cabinet and configured to transfer heat from a burned fuel to said air, said heat exchanger including:
      a first clamshell half having a first through-hole therein;
      a second clamshell half having a second through-hole therein;
      a passageway formed by first and second clamshells, with a seal region located between portions of said passageway; and
      a fastener located within said first and second through-holes within said seal region, said fastener configured to rigidly join said first clamshell half to said second clamshell half while allowing relative lateral motion between said first and said second clamshell halves, wherein said fastener is located adjacent an interference pattern located within said seal region.

13. The furnace of claim 12, wherein said fastener is an eyelet that includes a ring portion and a crimped portion, said first and second clamshell halves being located between said ring portion and said crimped portion.

14. The furnace of claim 12, wherein only one of said fastener is located between a combustion region and an exhaust region of said passageway.

15. The furnace of claim 14, wherein said fastener is located at a distance from a beginning of said combustion region that is between about 40% and about 50% of a distance from a beginning of said combustion region to an end of said combustion region.

16. The furnace of claim 14, wherein said combustion region has a location after a heat exchanger inlet at which adjacent walls of said combustion region and said exhaust region become about parallel, and said fastener is located at a distance from said location that is about 30% of a distance from said location to an end of said combustion region.

17. The furnace of claim 12, further comprising a serpentine passage.

* * * * *